United States Patent [19]

Ohmi et al.

[11] 4,354,423
[45] Oct. 19, 1982

[54] REACTION STRUCTURE OF BOOSTER

[75] Inventors: Atsushi Ohmi, Anjo; Kaoru Tsubouchi, Toyota; Michiharu Nishii, Chiryu, all of Japan

[73] Assignee: Aisin Seiki Co., Ltd., Kariya, Japan

[21] Appl. No.: 148,372

[22] Filed: May 9, 1980

[30] Foreign Application Priority Data

May 10, 1979 [JP] Japan ................... 54-57729

[51] Int. Cl.³ .............................................. F15B 9/10
[52] U.S. Cl. .................. 91/369 A; 91/376 R
[58] Field of Search ............. 91/369 A, 369 B, 369 R; 60/552, 554

[56] References Cited

U.S. PATENT DOCUMENTS

| | | | |
|---|---|---|---|
| 3,110,031 | 11/1963 | Price ................................. | 91/369 A |
| 3,132,567 | 5/1964 | Ingres et al. ...................... | 91/369 A |
| 3,172,334 | 3/1965 | Wuellner et al. ................. | 91/369 A |
| 3,289,547 | 12/1966 | Kytta ................................ | 91/369 A |
| 3,733,822 | 5/1973 | Monroe ............................. | 91/391 R |
| 4,005,639 | 2/1977 | Welsh, Jr. ......................... | 91/369 A |
| 4,200,029 | 4/1980 | Ohmi ................................ | 91/369 A |

*Primary Examiner*—Paul E. Maslousky
*Attorney, Agent, or Firm*—Finnegan, Henderson, Farabow, Garrett & Dunner

[57] ABSTRACT

A reaction structure of a brake booster comprises a deformable reaction disc with a peripheral edge rounded at a radius off corresponding to the radius of the rounded edge of a larger bore receiving the reaction disc. On a brake operation, the reaction disc is coaxially compressed between a second valve element interposed with a clearance thereto and connected to an input pushing rod and a power output rod, thereby resulting in a definite jumping value without indefinite delay of output power rise.

3 Claims, 5 Drawing Figures

REACTION STRUCTURE OF BOOSTER

BACKGROUND

The present invention relates to a pneumatic brake booster for reducing the force required to be applied to a brake pedal of a motor vehicle, particularly the reaction structure of such brake booster. Conventional reaction structures for such a booster comprises lever means or an elastic reaction disc, the latter being of advantage due to a simpler structure and easier assembly than the former.

The elastic reaction disc is usually made of rubber material. The conventional brake booster using this rubber reaction disc: comprises a cylinder housing, power piston means axially movable within the housing and defining two chambers a cylindrical hollow shaft, a control valve mechanism including first and second valve elements coaxially aligned in the shaft for controlling the pressure in both chambers of the power piston and being operatively connected to a manually operable push rod for controlling the control valve mechanism, a power output rod with its rear, end axially slidably inserted in the power piston, a smaller bore connected to the larger bore and receiving a front end of the second valve element, an elastic reaction disc inserted in the larger bore abutting the rear end of the power output rod and being received by a shoulder of the larger bore and facing an open end of the smaller bore. The reaction disc is adapted to be compressed between the power output rod end, the second valve element and the power piston inner surface upon booster operation.

In the booster for use of an automobile brake it is required that no reaction power responding to an input power is produced at an initial stage of a booster operation until the power output reaches a predetermined value, i.e. generally so-called a jumping value J. This requirement is accomplished by an existing clearance t between the reaction disc and a front end of the second valve element thereof at a neutral (or nonactuated) condition of the control valve mechanism. Since this clearance t directly defines the characteristics and performance of the booster, it should definitely be controled, whereas known boosters have large variations which are a disadvantage. These variations prevent a driver from sensing the exact beginning of braking action, leading him roughly to step on the brake pedal causing a sudden, strong braking action due to delayed and indefinite jumping values.

SUMMARY OF THE PRESENT INVENTION

Therefore, it is an object of the present invention to provide a novel reaction structure for brake booster.

It is a further object of the present invention to provide a reaction structure susceptible of eliminating variations of the jumping values.

Further objects of the present invention will be apparent in the following description and drawings.

According to invesigations by inventors over the jumping variations, the reason has turned out as follows: The power piston is made of plastic material at least at its central portion like a piston hub due to views of cost and weight, and a peripheral rear bottom edge of the larger bore of the piston hub at its bottom shoulder periphery has a rounding to prevent crack formation due to a stress concentration. On the other hand, a corresponding peripheral edge of the reaction disc has no such rounding off, which causes variations of the clearance due to varying placements of the reaction disc in the larger bore upon its assembly since the disc assembly is usually done in a simple manner without applying a specified force or pressure.

Accordingly, the present invention provides a reaction disc having the same rounding off at its rear peripheral edge as that of the rear bottom edge of the larger bore which can eliminate the drawbacks of the prior art as aforementioned. The reaction structure of the present invention using this edge-rounded reaction disc responds to the input power without dispersed variations of the jumping values, or without uncertain delay in stabilizing an output power ratio to the input power upon reaching a responsive state from a nonresponsive initial condition. Furthermore, the jumping value (per se, absolute value) corresponding to a predetermined clearance value t between the reaction disc i.e. more strictly the rear bottom (shoulder) of the larger bore and the front end of the second valve element, can be diminished in the present invention from that in the prior art.

DETAILED DESCRIPTION

In the following, a preferred embodiment is illustrated by drawings, which however, do not limit the present invention thereto and allows modifications or variations apparent to a person skilled in the art without departing from the gist of the present invention.

Figure 1:
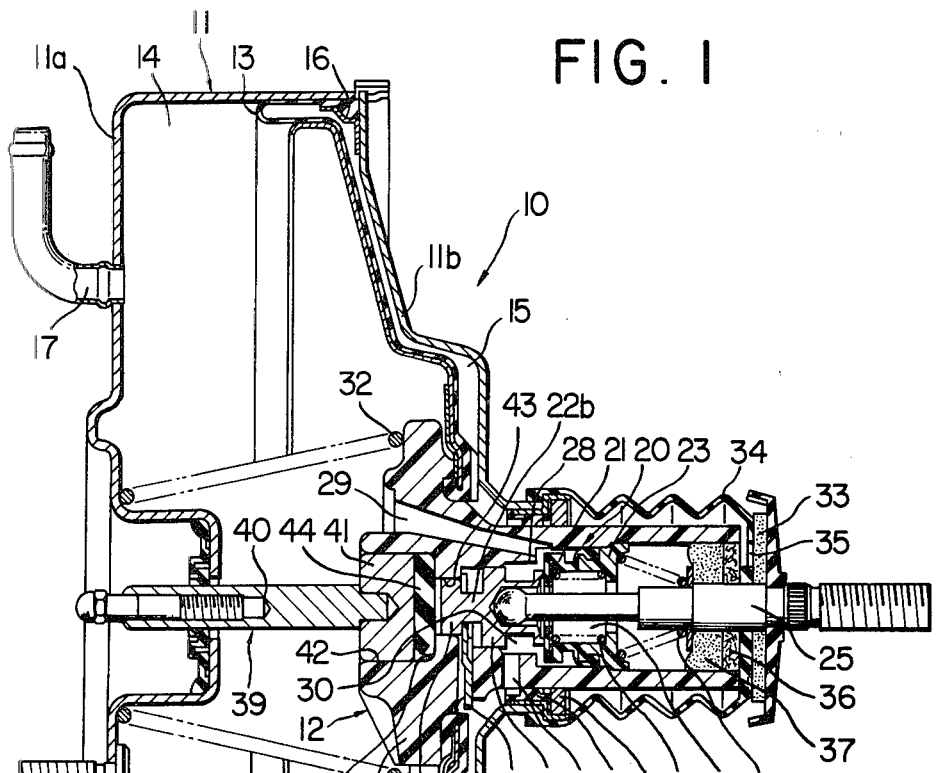
FIG. 1 is a cross sectional view of an embodiment of the present invention.

Referring to FIG. 1, a cylinder housing 11 of a brake booster 10 comprises of a front shell 11a and a rear shell 11b integrally secured to each other. The housing 11 defines an inner space which is isolated into a front and rear pneumatic chambers 14 and 15 by a power piston 12 and an annular diaphragm 13. The power piston 12 comprises a center hub made of synthetic resin 12a and a integrally secured disc-like peripheral member 12b made of metallic material.

The diaphragm 13 is at its outer periphery sealingly secured to the housing 11 by means of a retainer 16 which is secured on the interior surface thereof, while an inner periphery of the diaphragm 13 is sealingly secured between the inner periphery of the disc-like member 12b and center hub 12a. The front chamber 14 is connected to an intake manifold of an engine (not shown) through a port 17 mounted on the housing 11 via a check valve (not shown), whereby a suction (negative pressure is normally applied to the front chamber 14 while the engine is running.

The hub 12a of the power piston 12 is integrally provided with a cylindrical hollow shaft 12c rearwardly extending therefrom and out of a center hole of the rear shell 11b coaxially slidable with this center hole. In this center hole, a sealing member 19 is mounted together with a bearing member 18 for the hollow shaft 12c. The hub 12a of the power piston 12 has a coaxial center bore extending and connecting to the cylinder of the hollow shaft 12c, wherein known control valve mechanism 20, comprising a control valve (first valve element) 21 and a second valve element 22, is coaxially arranged. The first valve element 21 is at its rear end sealingly secured to the inner surface of the hollow shaft 12c, while a front end thereof is axially slidable due to the elasticity of the intermediate hollow cylindrical portion, and is forwardly biased by a spring 24 and urged to seat on a valve seat 28 formed as a projected rear shoulder of the center hub 12. The second valve element 22 is operatively connected to a front end of a push rod 25 which is further operatively associated with the brake pedal (not shown). Movement of this second valve element 22 is rearwardly limited by means of a key 26 mounted in a radial slot of the power piston 12, which key 26 comprises a slit engageable with a reduced diameter portion 22b adjacent to a front end of the second valve element 22. Under a released (unloaded) condition of the brake pedal, the push rod 25 is rearwardly moved according to the return of the brake pedal and due to the spring 27, the second valve element 22 is located at a position as shown in FIG. 1 limited by the key 26, thus the rear end of the second valve element 22 comes to abut the first valve element 21 at its front end inner periphery, whereupon the outer periphery of its front end is spaced from seat 28 of the power piston hub 12a. As a result suction pressure in the front chamber 14 is fed to the rear chamber 15 through a connected passages, i.e. a passage 29 in the hub 12a—the gap between the second valve element 21 and the seat 28—annular passage 30 spaced around the second valve element 22—radial passage 31 in cylindrical hollow shaft 12c, consequently bringing the rear chamber 15 to an even pressure with the front chamber 14. Thus the power piston 12 is retained at a retracted position as shown in FIG. 1 effected by a return spring 32.

Figure 2:
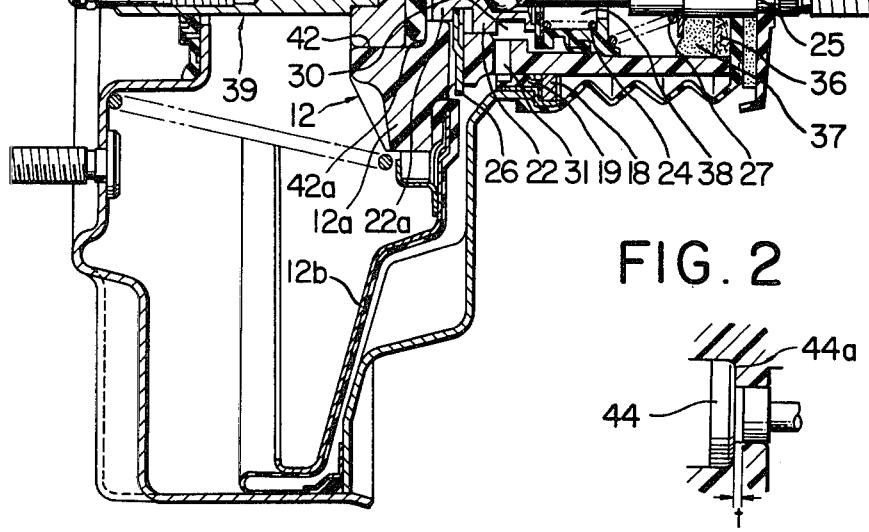
FIG. 2 is a fragmental view of FIG. 1.

When the brake pedal is applied the push rod 25 advances bringing the second valve element 22 to an advanced position. The front end of second valve element 21 is biased by spring 24 to abut valve seat 28 and to isolate the rear chamber 15 from the front chamber 14. Then the rear end of the second valve element 22 becomes spaced from control valve 21, permitting introduction of atmospheric air into the rear chamber through following passages: a filter 33—hole 35 of a corrugated boot 34—filters 36 and 37—a passage 38 around the push rod 25—a gap between the first valve element 21 and the rear end of the second valve element 22—annular passage 30—radial passage 31, then a pressure difference between both chambers 14, 15 produced by an increased pressure in the rear chamber 15 forwardly thrusts the power piston 12. This thrust power is derived therefrom by means of a power output member 39, which comprises a rod 40 slidably and sealingly passing through the front shell of the housing 11 and a cylindrical head 41 integrally connected to the rear end of the rod 40. The cylindrical head 41 being slidably inserted in a larger bore 42 disposed in the center hub 12a of the power piston 12. This larger bore 42 connects with a smaller bore 43 of a smaller diameter than the larger bore 42, the front end 22a of the second valve element 22 being slidably mounted in the smaller bore 43. In the larger bore 42 an elastic or deformable reaction disc 44, preferably made of rubber, is mounted on the rear end of the cylindrical rod 41. The peripheral bottom edge 42a of the larger bore 42 is rounded so as to prevent a crack formation due to the stress concentration in the hub 12a of the power piston 12, whereas the peripheral rear edge 44a corresponding to the rounding 42a is evenly rounded off with the same radius as the rounding 42a (FIG. 2). Accordingly, the reaction disc 44 can simply be inserted into the larger bore 42 with a precise positional setting.

The clearance t between the reaction disc 44 and the front end of the second valve element 22, as shown in FIG. 2, will be reduced upon advance of push rod 25 and the second valve element 22 caused by brake pedal depression, nevertheless this clearance t does not become zero so long as the first valve element 21 abuts the seat 28 and the second valve element 22 is still held in contact with the first valve element 21, i.e. under the neutral condition. Consequently at an initial stage wherein the second valve element 22 becomes spaced from the first valve element 21 and the pressure of the rear chamber 15 increases to cause forward thrust in the power piston 12, the reaction disc 44 does not contact with the second valve element 22, the forward thrust being transmitted from the power piston 12 to the power output rod 39 through the reaction disc 44, whereas no reaction power responding to the thrust is transmitted to the brake pedal at this initial stage. Since the reaction disc 44 is compressed between the power piston 12 and the power output rod 39, the reaction disc 44 at its rear end is deformed to enter into the smaller bore 43 and to contact against the front end of the second valve element 22, thereby imparting a rearward reaction force thereto proportionally counteracting the stepping-down force of the brake pedal, i.e. a reaction force is transmitted to the brake pedal. If this reaction force overcomes the stepping down force of the brake pedal, the second valve element 22 retracts and, its rear end contacts first valve element 21 to assist spacing valve element 21 from seat 28, whereby the suction pressure of the front chamber 14 is fed to the rear chamber 15 to diminish the pressure difference therebetween, thereby to decrease the forward thrust of the power piston 12. On the other hand, when the reaction force does not overcome the stepping-down force of the brake, atmospheric pressure is fed to the rear chamber 15 enhancing the forward thrust of the power piston 12.

Figure 3:
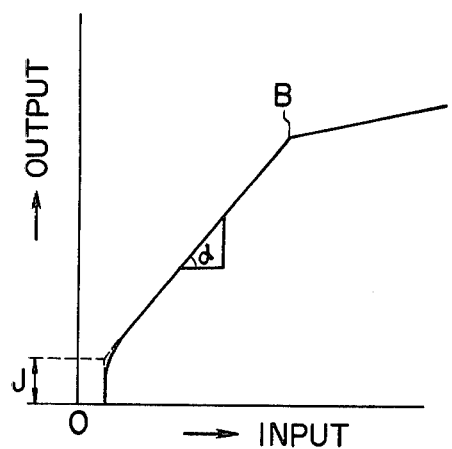
FIG. 3 graphically shows a relationship of the output power to the input power in the present invention.

FIG. 3 graphically shows this characteristic curve representing the relationship of output power to the stepping-down force (input force) of the brake, wherein a distance referred to by "J" indicates the jumping value, and an angularly bent point B representing an end point of the booster operation, i.e. power multiplying operation. The "tan α" in FIG. 3 shows the output power ratio to the input power, being represented by a formula $(S-S_1)/S_1$ wherein S is a cross-sectional area of the reaction disc 44 and $S_1$ that of the second valve element 22. The jumping value J is defined by the clearance t between the front end of the second valve element 22 and the rear end of the reaction disc 44 under the neutral condition of the control valve mechanism 20, which clearance t is essential to accomplish a predetermined, desired performance. According to the present invention, the reaction disc 44 provided with the same rounding off at its peripheral rear edge 44a as that of the larger bore bottom edge 42a permits a precise positional setting of the reaction disc upon assembly in the larger bore 42, whereby the resultant variation of the clearance t between the reaction disc 44 and the second valve element 22 can be diminished thereby diminishing variations of the jumping value J.

Figure 4:
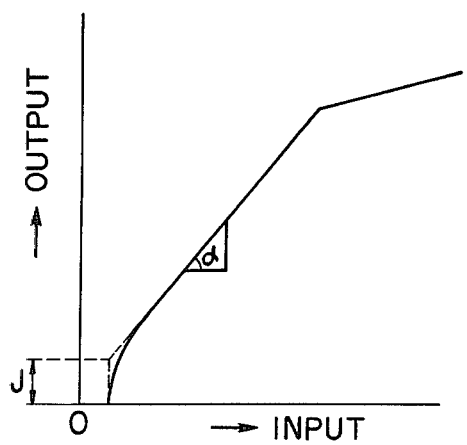
FIG. 4 shows a similar relationship in the prior art.

With respect to the precise positional setting of the reaction disc 44 in the larger bore 42, a larger rounding off with a larger radius for the reaction disc edge 44a than that of the larger bore edge 42a would suffice but would lead to a disadvantage. In this case, a gap left between edges 42a and 44a disappears by filling-up with the compressed and deformed reaction disc 44 through the initial stage of the reaction procedure, whereby stabilization of the output power ratio (i.e. output power rise) is delayed as shown in FIG. 4 because the cross-sectional area of the reaction disc for the thrust transmission between the power piston 12 and the reaction disc 44 varies while the clearance closes, resulting in a curve as shown in FIG. 4 which is indicated by an rounded curve vaguely defining the jumping value J.

Figure 5:
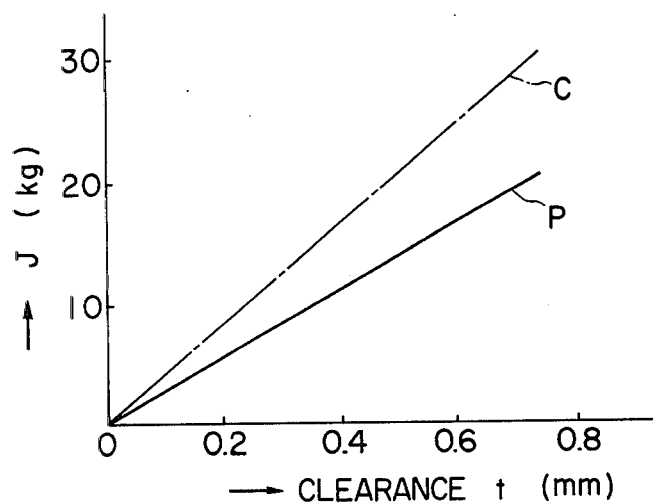
FIG. 5 shows a relationship of the jumping value to the clearance t.

In FIG. 5, the relationship of the jumping value J to the clearance t between the reaction disc 44 and the second valve element 22 under the neutral condition thereof in the present invention are indicated by a line P and in the prior art by a line C (using a reaction disc without rounded edge) according to tests. As be seen is FIG. 5, the jumping values (line P) responding to the clearance t in the present invention vary at a smaller rate (gradient) than those in the prior art (line C). This feature is considered to be a result of following: The edge rounding off 44a of the reaction disc 44 causes diminished friction between the edge 44a of the reaction disc 44 and the edge 42a of the larger bore 42, enabling the peripheral portion of the reaction disc 44 easily to move radially inwards into the smaller bore 43 upon the deforming movement. The smaller variation rate of the jumping value J to the increase of the clearance t in the present invention allows a larger tolerance for the parts dimensions such as the second valve element and so on, permitting a relatively easier and simpler manufacture thereof.

As apparent from the disclosure hereinabove, the present invention provides a reaction structure for a booster comprising a reaction disc 44 with a rounded peripheral rear edge 44a corresponding to the rounding at the edge 42a of the larger bore 42, thereby reducing the variations of the jumping value without indefinite delay of the output power rise thus enabling an enlarged allowable tolerance for the parts manufacture.

The reaction structure of the booster of the present invention can appropriately be applied to boosters comprising no diaphragm for piston sealing and also to such boosters provided with a control valve mechanism comprising a different type of valve means and a related structure provided that such valve means play the same roll therein as the valve means disclosed in the present invention.

What is claimed is:

1. In a brake booster including:
a cylinder housing,
a power piston with a center hub of synthetic resin axially movable within the housing and including a cylindrical hollow shaft rearwardly extending from the center hub, a control valve mechanism arranged in the cylindrical hollow shaft and including first and second valve elements coaxially aligned, the second valve element being operatively connected at its rear end with a manually operable push rod and the front end thereof being slidably disposed in a small bore in the hub of said power piston, a power output rod with its rear end axially slidably disposed in a large bore in the hub of said power piston, said large bore having a peripheral wall of synthetic resin perpendicular to a rear end wall of synthetic resin and being coaxial with and open at its rear end to the front opening of said small bore, a peripheral wall of said small bore intersecting the rear end wall of said large bore at a right angle and the intersection of the peripheral wall and rear end wall of said large bore defining an annular corner at the rear end of said large bore, and an elastic reaction disc being disposed in the large bore and abutting the rear end of the power output rod, said reaction disc in an uncompressed state having a peripheral wall of a diameter substantially equal to and being parallel to the peripheral wall of said large bore and having a rear end wall parallel to the rear end wall of said large bore, the intersection of the peripheral and rear end walls of said reaction disc defining an annular corner, said reaction disc being received in said large bore so as to be compressed upon booster operation between the rear end of the power output rod and the front end of the second valve element and the rear end wall of said large bore, the improvement comprising the annular corners of said large bore and said reaction disc in an uncompressed state each being rounded at the same predetermined radius and the rear end wall and annular corner of said reaction disc directly contacting and cooperating with the rear end wall and annular corner of said large bore to permit precise determination of the time and distance of compression of the rear end wall of said reaction disc into said small bore to contact the front end of said second valve element thereby providing a definite jumping value without indefinite delay of output power rise.

2. The brake booster of claim 1, wherein the second valve element is spaced from the rear end wall of the reaction disc a predetermined distance so as to permit a predetermined jumping value of a power output upon an operation.

3. The brake booster of claim 1, wherein the front end surface of the second valve is at a right angle to its axis.

* * * * *